United States Patent [19]
Konkal et al.

[11] 3,888,341
[45] June 10, 1975

[54] PALLET LOCATING AND CLAMPING APPARATUS FOR WORK TRANSFER MACHINERY

[75] Inventors: John Konkal, Bloomfield Hills; James Egbert, Union Lake, both of Mich.

[73] Assignee: La Salle Machine Tool, Inc., Warren, Mich.

[22] Filed: Mar. 26, 1973

[21] Appl. No.: 344,757

[52] U.S. Cl. .................................. 198/19; 294/116
[51] Int. Cl. ............................................. B65g 25/00
[58] Field of Search ....................... 198/19; 294/116

[56] References Cited
UNITED STATES PATENTS 3,066,396  11/1961  Erkelens ............................. 198/19
3,155,217  11/1964  Cross ................................... 198/19

*Primary Examiner*—Richard A. Schacher
*Assistant Examiner*—Jeffrey V. Nase
*Attorney, Agent, or Firm*—Olsen and Stephenson

[57] ABSTRACT

In work transfer machinery, particularly for machine tool application, which includes a work station and a pallet movable into and out of the station, apparatus for automatically locating the pallet in a predetermined position, and thereafter releasably clamping the pallet in this position. An actuator shaft operates to first move the pallet locators into the pallet and to subsequently provide for spring pressure activated movement of clamping arms into clamping engagement with the pallet.

3 Claims, 4 Drawing Figures

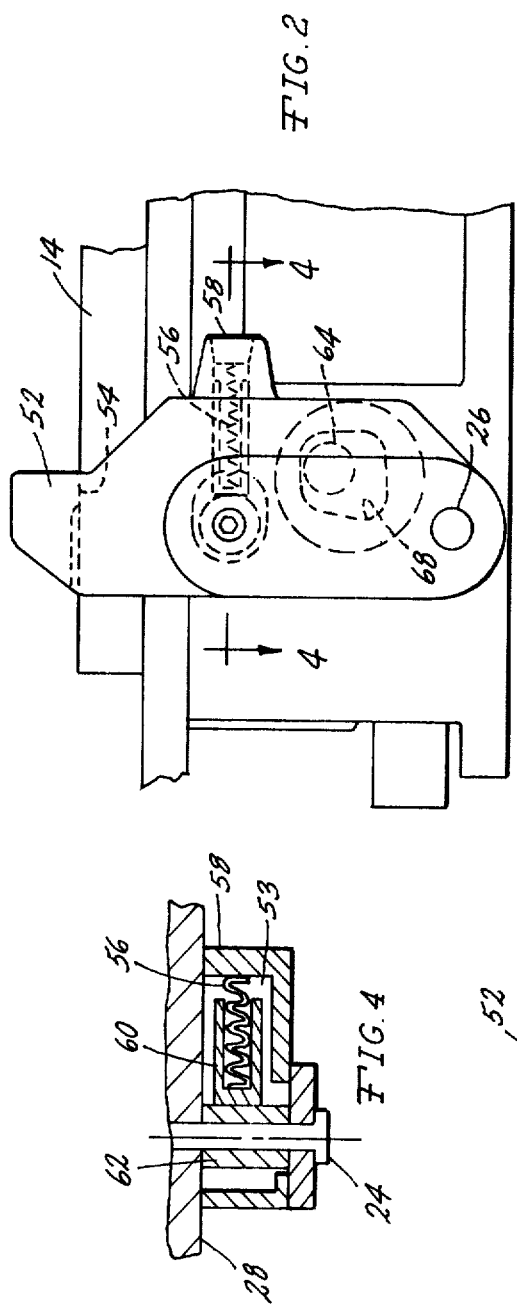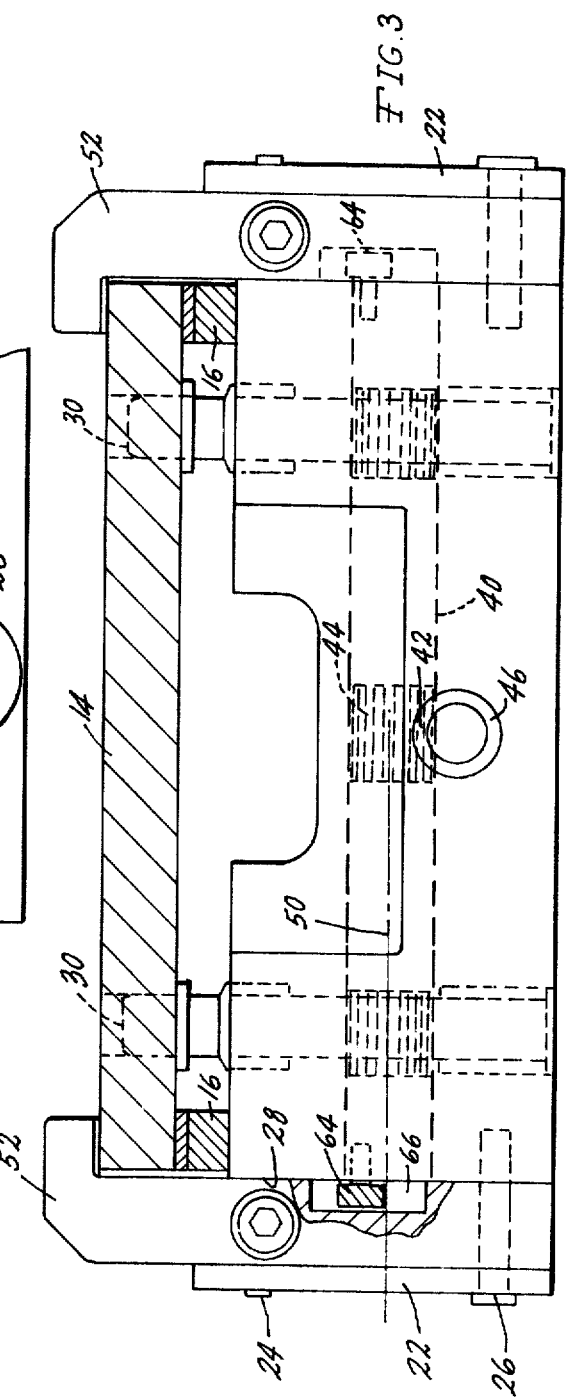

3,888,341

PALLET LOCATING AND CLAMPING APPARATUS FOR WORK TRANSFER MACHINERY

BACKGROUND OF THE INVENTION

It is common in machine tool automation equipment to mount the workpieces on pallets which are in turn slidably mounted on slide rails. A transfer mechanism is provided for moving the pallets and the workpieces thereon through in-line equally spaced work stations. At each station, it is first necessary to locate the pallet so that the work thereon is in a predetermined position relative to the machine tools at that station. Once the pallet has been precisely located, it is necessary to firmly clamp the pallet onto the rails so that the workpiece will not move during the subsequent machine tool operations. A transfer machine of this general type is illustrated in U.S. Pat. No. 3,155,217. It is an object of the present invention to provide improved apparatus of this type.

SUMMARY OF THE INVENTION

In the apparatus of this invention, the locator pins are provided in diagonally opposite corners of the pallet and four clamp arms are provided, the arms being arranged in pairs in directions extending transversely of the slide rails. An actuator shaft is provided for each pair of arms and the locator pin associated therewith, with the actuator shafts being in turn rotated in response to movement of an actuator rod that is parallel to the slide rails. When an actuator shaft is rotated in one direction, it provides first for movement of a locating pin into the pallet so as to precisely locate the pallet in the work station and subsequently provide for engagement of the clamp arms with the pallet. Internal springs associated with the clamp arms provide for direct spring pressure on the clamp arms so as to maintain them in firm engagement with the pallet to insure that the arms will perform their intended clamping function. Cam followers carried by the actuator shaft are movable into engagement with coacting cams formed on the clamp arms in response to rotation of the actuator shaft in an opposite direction to thereby move the clamp arms to release positions with respect to the pallet. Also, in response to this rotation of the actuator shafts, the locator pins are withdrawn from the pallet. Thus, the apparatus of this invention provides simple, reliable structure for locating and clamping pallets at work stations.

Further objects, features and advantages of this invention will become apparent from a consideration of the following description, the appended claims, and the accompanying drawing in which:

FIG. 2 is a fragmentary elevational view, like FIG. 1, showing a clamping arm in clamping position;

FIG. 3 is a transverse sectional view of the structure shown in FIG. 1; and

FIG. 4 is a detail sectional view as seen from substantially the line 4—4 in FIG. 2.

Figure 1:
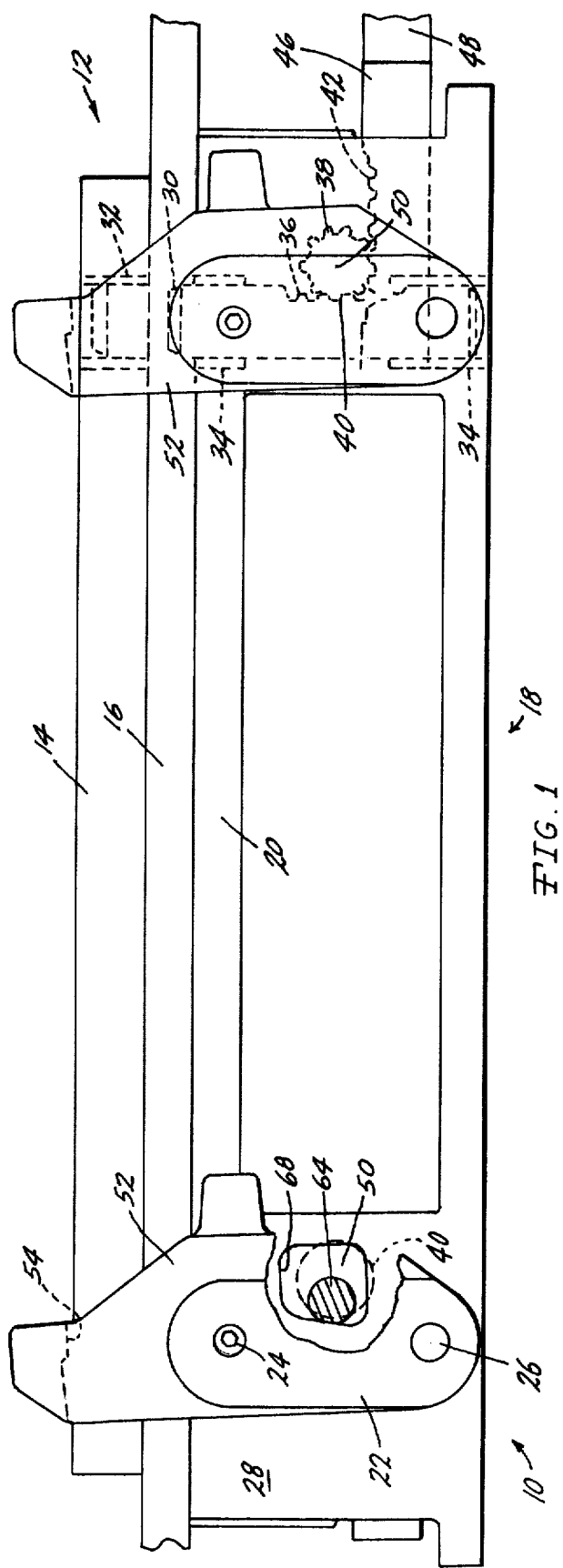
FIG. 1 is a fragmentary side elevational view of a transfer machine showing a pallet in position at a work station and illustrating the pallet locating and clamping apparatus of this invention in position preparatory to locating and clamping the pallet in the illustrated work station.

With reference to the drawing, the pallet locating and clamping apparatus of this invention, indicated generally at 10, is illustrated in FIG. 1 in assembly relation with a transfer machine 12 which includes pallets 14, only one of which is shown, slidably mounted on rails 16. A conventional transfer bar (not shown) movable into and out of engagement with the pallets 14 is operable to move the pallets 14 between a plurality of equally spaced in-line stations, one of which is illustrated in FIG. 1 and indicated generally by the numeral 18. The station 18 includes a main frame 20, on which the rails 16 are mounted, and side plates 22 that are secured to the frame 20 by bolt assemblies 24 and 26 so that the plates 22 are in positions spaced from the sides 28 of the frame 20.

The apparatus 10 includes a pair of locating pins 30 disposed at diagonally opposite corners of the pallet 14. Suitable controls (not shown) are provided according to conventional practice to regulate the indexing movement of the pallets 14 by the transfer bar so that the pallets 14 are positioned with some accuracy in the stations to which they are transferred. Each pin 30 is movable upwardly from a lower retracted position (FIG. 1) to an upper locating position in which the pin enters a bushing 32. The pins 30 and bushings 32 are machined so that they have a very close fitting relationship and the upper end of the pin is beveled so that during insertion of a locating pin 30 in a bushing 32, the final adjustment in the position of the pallet 14 is obtained to thereby precisely locate the pallet in the station 18.

Each locating pin 30 is slidably mounted in support tubes 34 carried by the frame 20 and is provided on one side with rack teeth 36 which mesh with a pinion 38 on an actuating shaft 40 that is rotatably mounted on the frame 20 so that it extends transversely of the rails 16. A second pinion 44 on the shaft 40 meshes with rack teeth 42 on an actuator rod 46 which is parallel to the slide rails 16. Suitable means, such as the cylinder assembly 48 (FIG. 1) is provided for moving the actuator rod 46 axially. Thus, in response to longitudinal movement of the rod 46, the shaft 40 is rotated about an axis 50 that extends transversely of the rails 16. A similar shaft 40 which actuates the other locator pin 30 is also driven by the rod 46 so that it is rotated about its axis 50.

A pair of clamp arms 52 is provided for each actuator shaft 40, each arm 52 being positioned between a plate 22 and the frame side 28. Each clamp arm 52 is pivotally supported at its lower end on the bolt assembly 26 so that it can pivot between the release and clamping positions illustrated in FIGS. 1 and 2, respectively.

A clamping surface 54 is provided on the upper end of each clamp arm 52 at a position engageable with the top surface of the pallet 14 in the clamping position of the arm shown in FIG. 2. A compression spring 56 (FIGS. 2 and 4) exerts direct spring pressure on the arm 52 in order to move the arm to the clamping position shown in FIG. 2. Each arm 52 is formed with an internal cavity 53 and the spring 56 is disposed therein in engagement with one side wall 58 of the arm 52. The spring 56 extends into a cylinder 60 which is in turn positioned in engagement with an abutment bushing 62 mounted on the bolt assembly 24. Thus, the spring 56 exerts constant spring pressure directly on the clamp arm wall 58 tending to rotate the arm 52 in a clockwise direction about the bolt assembly 26 toward the clamping position for the arm shown in FIG. 2.

As shown in FIG. 3, the shaft 40 is provided at its ends with cam followers 64 positioned in irregular shape cavities 66 in the arms 52. Each cam follower 64 consists of a pin mounted in an eccentric position in the shaft 40 so that in response to rotation of the shaft 40, the pin 64 will move about the shaft axis 50. The side wall 68 of the cavity 66 constitutes a cam and the pin 64 is positioned so that in response to rotation of the shaft 40 in a counterclockwise direction as viewed in FIG. 2, starting with the cam follower 64 in the position shown in FIG. 2, the cam follower 64 is first moved into engagement with the cam 68 and is then moved along the cam 68 so as to move the arm 52 in a counterclockwise direction. When the cam follower 64 reaches the position shown in FIG. 1, the arm 52 is in the release position. Concurrently with rotation of the shaft 40 to move the arm 52 to the release position shown in FIG. 1, the pinion 38 operates to move the corresponding locator pin 30 downwardly out of the bushing 32 to the retracted position.

In the operation of the apparatus 10, assume that the clamp arms 52 are in their release positions shown in FIG. 1, that the locator pins 30 are retracted, and that the pallet 14 has been moved into approximately its final position at the station 18. The actuator rod 46 is moved to the left as viewed in FIG. 1 to in turn rotate the meshing pinions 44 in a direction to rotate the shafts 40 in a clockwise direction as viewed in FIG. 1. The pinions 38 will move the locator pins 30 upwardly so that they project into the bushings 32 and act to position the pallet 14. Simultaneously, the cam followers 64 will be moved to release positions, such as the position shown in FIG. 2, and the springs 56 will move the clamp arms 52 into clamping positions. The arms 52 will then function under the direct pressure of the springs 56 to clamp the pallet 14 in the station 18 until the work has been completed on the workpieces carried by the pallet 14. At such time, the actuator rod 46 is moved to the right as viewed in FIG. 1 to in turn rotate the shafts 40 so as to retract the locator pins 30 and rotate the cam followers 64 to in turn move the clamp arms 52 against the pressures of the springs 56 to the release positions shown in FIG. 1. The pallet 14 can then be moved out of the station 18 so that the next succeeding in-line pallet can be moved into the station 18.

From the above description, it is seen that this invention provides improved pallet locating and clamping apparatus 10 in which the clamp arms 52 operate under the direct action of the springs 56 to clamp the cylinder 14. The arm 52 is constructed and mounted so that the arm moves through a very small angle, 3 ½° in the illustrated embodiment, during movement from release to clamp position. This small angle arrangement multiplies the holding power of the arm 52. Furthermore, this clamping action is accomplished with a minimum of parts under circumstances in which the possibility for failure of the parts to function to clamp the pallet 14 in response to movement of the rod 46 in practically eliminated. Although four clamp arms 52 are employed in the illustrated apparatus 10, it is within the scope of the invention to employ only two.

What is claimed is:

1. In work transfer apparatus which includes a work station and a pallet movable into said station, a main frame at said station, at least one movable locator engageable with said pallet in said station to accurately position the pallet, a plurality of spaced apart clamp arms pivotally mounted on said main frame for engagement with said pallet to clamp the same securely in said station, each of said clamp arms being pivotally mounted at one end thereof on said frame and engageable at the other end thereof with said pallet, a spring member extending between said main frame and each of said clamp arms and positioned in direct engagement with said clamp arm intermediate the ends thereof so as to urge said clamp arm toward an engaged position with said pallet, a plurality of support plates corresponding to said clamp arms, each of said support plates being mounted on and spaced from one side of said main frame, pivot means extending between each of said plates and said frame and pivotally supporting one of said arms at a position therebetween, abutment means extending between each of said plates and said frame at a position intermediate the ends of said one clamp arm, one of said spring members extending between said abutment means and one side of said clamp arm so as to urge said clamp arm in one direction, a rotatable actuator shaft, means responsive to rotation of said shaft in one direction for retracting said locator from said pallet and moving said clamp arms against the pressure of said springs to a position disengaged from said pallet, and means responsive to rotation of said shaft in an opposite direction for advancing said locator into engagement with said pallet and releasing said clamp arms for urging by said springs into engagement with said pallet.

2. Apparatus according to claim 1 wherein said means for moving said clamp arms comprises cam follower means mounted on said shaft and cam means on said clamp arms located so that in response to rotation of said shaft in said one direction said cam follower means is moved into engagement with said cam means and coacts therewith to provide for movement of said clamp arms against the pressure of said springs to a position disengaged from said pallet.

3. Apparatus according to claim 2 wherein said cam follower means comprises pin members mounted in an eccentric position on said shaft.

* * * * *